(12) United States Patent
Doser et al.

(10) Patent No.: US 8,970,636 B2
(45) Date of Patent: Mar. 3, 2015

(54) SYSTEM AND METHOD FOR COLOR CORRECTION BETWEEN DISPLAYS WITH AND WITHOUT AVERAGE PICTURE DEPENDENCY

(75) Inventors: Ingo Tobias Doser, Donaueschingen (DE); Bongsun Lee, La Crescenta, CA (US); Carlos Correa, Villingern-Schwenningen (DE)

(73) Assignee: Thomson Licensing, Boulogne-Billancourt (FR)

(*) Notice: Subject to any disclaimer, the term of this patent is extended or adjusted under 35 U.S.C. 154(b) by 674 days.

(21) Appl. No.: 12/452,203

(22) PCT Filed: Jun. 27, 2007

(86) PCT No.: PCT/US2007/014966
§ 371 (c)(1),
(2), (4) Date: Dec. 18, 2009

(87) PCT Pub. No.: WO2009/002316
PCT Pub. Date: Dec. 31, 2008

(65) Prior Publication Data
US 2010/0128057 A1    May 27, 2010

(51) Int. Cl.
*G09G 5/10*    (2006.01)
*G06F 3/14*    (2006.01)
*G09G 5/02*    (2006.01)

(52) U.S. Cl.
CPC .. *G06F 3/14* (2013.01); *G09G 5/02* (2013.01); *G09G 2320/0271* (2013.01); *G09G 2320/0626* (2013.01)
USPC ........... 345/690; 345/589; 345/590; 345/600; 345/605; 382/167; 382/274

(58) Field of Classification Search
None
See application file for complete search history.

(56) References Cited

U.S. PATENT DOCUMENTS

| | | | |
|---|---|---|---|
| 6,337,692 B1* | 1/2002 | Rai et al. | 345/594 |
| 6,581,109 B1* | 6/2003 | Fields et al. | 709/246 |
| 7,119,760 B2* | 10/2006 | Edge et al. | 345/2.1 |
| 7,800,559 B2* | 9/2010 | Weitbruch et al. | 345/77 |
| 2002/0120781 A1 | 8/2002 | Hirashima et al. | |
| 2002/0165881 A1 | 11/2002 | Shelton | |
| 2003/0112378 A1 | 6/2003 | Okunuki et al. | |
| 2003/0217872 A1 | 11/2003 | Weitbruch et al. | |
| 2004/0125049 A1 | 7/2004 | Weitbruch et al. | |

(Continued)

OTHER PUBLICATIONS

Search Report Dated January 14, 2008.
Non-Final Office Action issued Oct. 3, 2012 in connection with U.S. Appl. No. 12/452,131.

(Continued)

*Primary Examiner* — Antonio A Caschera
(74) *Attorney, Agent, or Firm* — Robert D. Shedd; Wan Yee Cheung

(57) ABSTRACT

A system and method for compensating for average brightness dependency (ABD) differences between displays with and without average brightness dependency (ABD) includes color correcting source picture content on a reference display to output color corrected picture content. In addition, an ABD simulation process uses the color corrected picture content to simulate the display of content on the reference display. Subsequently, a compensation process receives the color corrected picture content and information from the simulation process and applies an ABD compensation characteristic to the color corrected picture content for correctly displaying the source picture content on a display with different ABD characteristics than the reference display.

20 Claims, 10 Drawing Sheets

(56) References Cited

U.S. PATENT DOCUMENTS

2005/0253825 A1   11/2005   Kawamura et al.
2006/0022915 A1   2/2006   Weitbruch et al.
2007/0132668 A1   6/2007   Thebault et al.
2010/0201667 A1   8/2010   Lee et al.

OTHER PUBLICATIONS

Final Office Action issued Jul. 19, 2013 in connection with U.S. Appl. No. 12/452,131.

Non-Final Office Action issued Mar. 7, 2014 in connection with U.S. Appl. No. 12/452,131.

* cited by examiner

US 8,970,636 B2

SYSTEM AND METHOD FOR COLOR CORRECTION BETWEEN DISPLAYS WITH AND WITHOUT AVERAGE PICTURE DEPENDENCY

This application claims the benefit, under 35 U.S.C. §365 of International Application PCT/US 2007/014966, filed Jun. 27, 2007, which was published in accordance with PCT Article 21(2) on Dec. 31,2008 in English.

TECHNICAL FIELD

The present invention generally relates to color correction, and more particularly, to systems and methods for editing colors in anticipation of average brightness dependency differences between reference and target displays.

BACKGROUND OF THE INVENTION

Many displays, mainly in the consumer field, include a dependency between local brightness and global picture brightness, or local color information and global color information. This is called "Average Brightness Dependency", or ABD. Another term is "APL" dependency, standing for "average picture level" or "average power level" dependency. ABD can be described as: a behavior, where a grey spot is displayed on a screen; then, the absolute brightness of that grey spot will depend not only on its code value but also on its geometrical size relative to the screen size, and further on the code value of the remaining area of the screen. In one example, for a cathode ray tube (CRT), it is mainly the power supply for the electron guns that is responsible for a limited total light output of the display system. In a plasma system, it is again the power supply, but also the power load for the so-called "line drivers" that puts constraints on the total light output of the display system.

Another example includes a function that can be found in today's displays, which is called "Dynamic Black". It can be found in liquid crystal displays (LCD), direct view, LCD, DLP, and LCOS rear projection displays, and LCD, DLP, and LCOS front projection displays. All of these displays are based on a "passive" light modulator that spatially modulates light coming from a light source. Display engineers have found that the total contrast range of such a display can be much higher if the light source is modulated itself, depending on the picture requirements. Circuitry driving the light modulation generally decreases light from the light source for dark pictures and increases light from the light source for bright pictures, thus creating an ABD. A display that does not exhibit an ABD or exhibits an ABD that is fundamentally different from a target display results in colors that may not look correct or may have a dissatisfying appearance on the target display.

SUMMARY OF THE INVENTION

Embodiments of the present invention address the deficiencies of the prior art by providing a method and system for compensating for average brightness dependency (ABD) differences between displays with and without average brightness dependency (ABD).

In one embodiment of the present invention, a method for compensating for average brightness dependency (ABD) differences between displays includes color correcting source picture content on a reference display to produce color corrected picture content and applying an ABD compensation characteristic to the color corrected picture content for correctly displaying the source picture content on a display with different ABD characteristics than the reference display.

In an alternate embodiment of the present invention, a system for compensating for average brightness dependency (ABD) differences between displays includes a color correction module configured to color correct source picture content on a reference display to produce color corrected picture content, a simulation module configured to receive the color corrected picture content and simulate the look of the corrected source picture content on the reference display on a display with ABD characteristics different from the reference display, and a compensation module configured to receive the color corrected picture content and information from the simulation module and to apply an ABD compensation characteristic to the color corrected picture content for correctly displaying the source picture content on a display with different ABD characteristics than the reference display.

BRIEF DESCRIPTION OF THE DRAWINGS

The teachings of the present invention can be readily understood by considering the following detailed description in conjunction with the accompanying drawings, in which.

Figure 1:
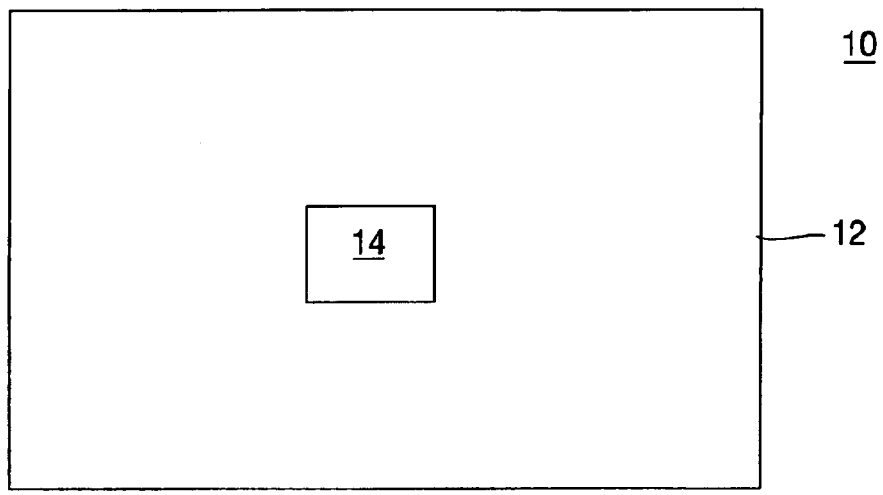
FIG. 1 depicts a graph illustrating an average brightness level dependency test picture.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

Embodiments of the present invention provide methods and systems for editing colors (color correction, color grading) in anticipation of an average brightness dependency (ABD) behavior of target displays. Embodiments in accordance with the present principles provide that ABD characteristics used during the content production process are used to predict/produce desired brightness/color characteristics on reproduction displays. There exist displays with many different ABD characteristics; in some cases, those ABD characteristics are designed into the display by means of signal processing. In other cases, display technologies exhibit their own characteristic ABD. However, in various embodiments of the present invention, an exact reproduction of consumer display behavior is not required; as long as the content that is produced using the approximation will produce a better match to the original intent than pictures created without such a model. To further improve the result, a reproduction display can be calibrated to a "reference" model or display.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

FIG. 1 depicts a graph illustrating an average brightness level dependency test picture. In FIG. 1, an exemplary test picture 10 is depicted to measure an average brightness dependency (ABD) of a display. The test picture 10 of FIG. 1 includes a black picture 12 with a grey spot 14. In one embodiment of the present invention, to measure the ABD, the picture levels of the spot 14 are kept constant while the spot size is increased. In alternate embodiments of the present invention, however, other known methods for measuring ABD are also contemplated.

Figure 2:
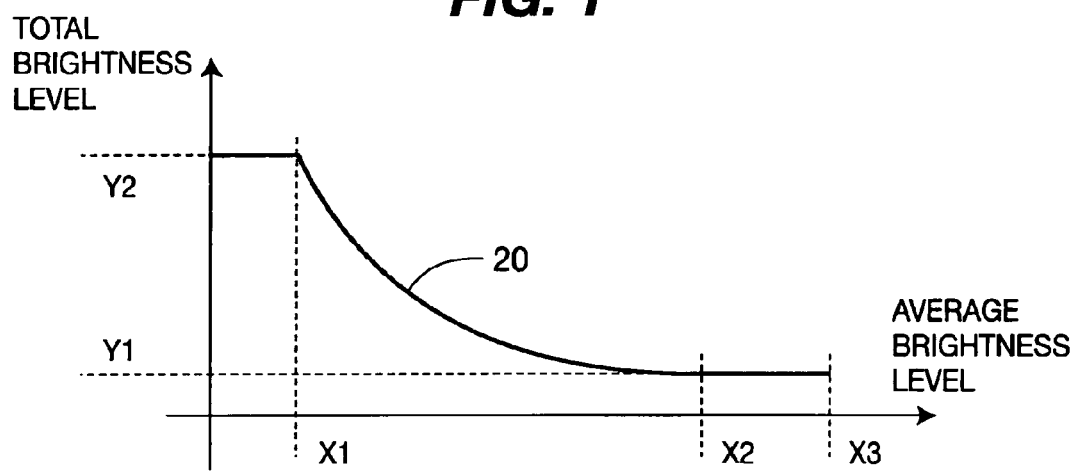
FIG. 2 depicts a graph illustrating a total brightness level versus average brightness level for CRT and plasma displays.

Referring to FIG. 2, FIG. 2 depicts a graph illustrating a total brightness level versus average brightness level for, for example, CRT and plasma displays. More specifically, FIG. 2 depicts a graph of luminance over spot size in percent for a given code value for the exemplary displays. That is, in FIG. 2 a characteristic example curve 20 of an average brightness behavior of a CRT or Plasma display is shown. Such a characteristic curve 20 typically has one to three segments, but is not limited to three segments. To explain the characteristic, a test picture with a white spot on a black background is assumed. X (or $ABD_{Act}$) denotes the spot size in percentage of the total picture size. For instance, on a high definition (HD) picture with 1920×1080 pixels, a spot with the size of 644×644 pixels is 20% of the picture size, thus X=20 for that spot size. Segment one from spot size zero to spot size X1 or ABD1 (in percent) is a segment where many displays exhibit a behavior of constant brightness Y2 for any spot sizes between 0 and X1. Between spot sizes X1 (ABD1) and X2 (ABD2), the brightness follows a characteristic described by a function or by a Look Up Table (LUT). For example, the brightness may follow the law of constant picture power, meaning that the picture power defined as spot size in percent times the brightness is kept constant using, for example, Equation one (1), which follows:

$$ABD_{out}(ABD_{Act})=(Y1+(Y2-Y1)(1/(ABD_{Act}-ABD1)))/\max(Y1,Y2), \tag{1}$$

where $ABD_{Act}$ is the spot size in percent (%), and $ABD_{out}$ is the output ABD (or Y). More specifically, X is the input value of ABD, and Y is the output value of ABD of a display with ABD.

Referring back to FIG. 2, a third segment may exhibit constant normalized brightness Y1 for spot sizes above X2. However, on current plasma or CRT displays, this third segment does not exist, but it may be used in future display systems. It should be noted that the thresholds, absolute brightness and functions can be different for each color channel (e.g., red (R), green (G), and blue (B)). As such, the picture modification can be described as:

$$R_{out}=f_{abd\ r}(R_{in});$$

$$G_{out}=f_{abd\ g}(G_{in});$$

$$B_{out}=f_{abd\ b}(B_{in});$$

where $f_{abd}$ a function which converts the color component input (e.g., $R_{in}$) to the output (e.g., $R_{out}$). The subscripts r, g and b designate the respective color components.

Taking the relationship of Equation 1, it follows that for each color component (R, G, B), $$R_{out} = \begin{cases} R_{in}^* Y1_r & \text{for } ABD_{Act\,r} < ABD1_r \\ R_{in}^* ABD_{out\,r}(ABD_{Act\,r}) & \text{for } ABD1_r [ABD_{Act\,r} [ABD2_r \\ R_{in}^* Y2_r & \text{for } ABD2_r < ABD_{Act\,r} \end{cases}$$

$$G_{out} = \begin{cases} G_{in}^* Y1_g & \text{for } ABD_{Act\,g} < ABD1_g \\ G_{in}^* ABD_{out\,g}(ABD_{Act\,g}) & \text{for } ABD1_g [ABD_{Act\,g} [ABD2_g \\ G_{in}^* Y2_g & \text{for } ABD2_g < ABD_{Act\,g} \end{cases}$$

$$B_{out} = \begin{cases} B_{in}^* Y1_b & \text{for } ABD_{Act\,b} < ABD1_b \\ B_{in}^* ABD_{out\,b}(ABD_{Act\,b}) & \text{for } ABD1_b [ABD_{Act\,b} [ABD2_b \\ B_{in}^* Y2_b & \text{for } ABD2_b < ABD_{Act\,b}. \end{cases}$$

The indexes r, g, b denote parameters related respectively to the color components R, G and B.

Figure 3:
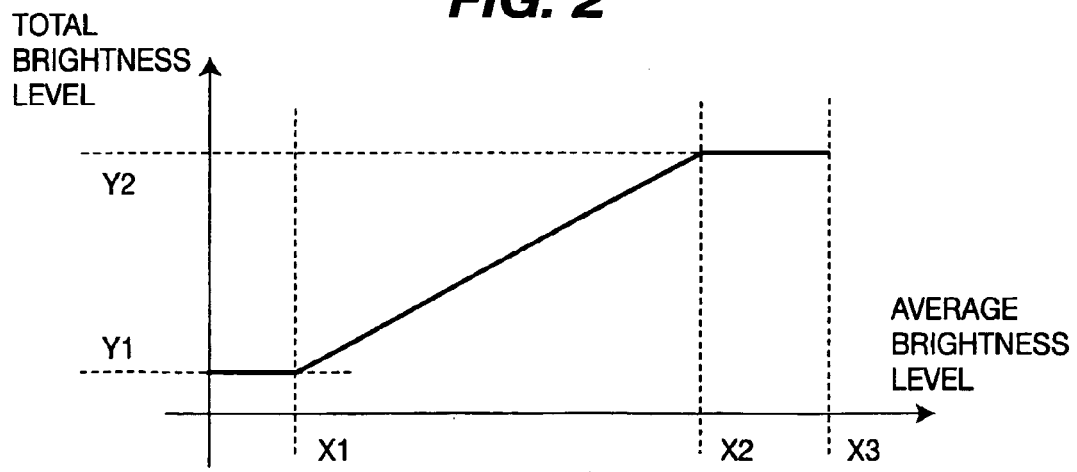
FIG. 3 depicts a graph illustrating a total brightness level versus average brightness level for dynamic black displays.

FIG. 3 depicts a graph illustrating a total brightness level versus average brightness level for dynamic black displays. Referring to FIG. 3, a characteristic average brightness level dependency of a display featuring the aforementioned "dynamic black" behavior is illustratively shown. More specifically, there may be a range of spot sizes from 0 to X1 with a constant brightness Y1. In addition, there is a range of spot sizes of size X1<spot size<X2 that follows, a relationship of increased brightness with increasing spot size. Then, most displays will have a third segment, with a constant brightness Y2 for spot sizes equal to or above the spot size X2. The function in the second segment may differ from one display to another depending on, for example, model, technology and manufacturer. The example shown in FIG. 3 uses the simplest implementation: a linear increase of brightness with spot size, however, in accordance with alternate embodiments of the present invention other functions (e.g., non-linear functions) may also be applied. For example, it should be noted that plasma displays, for example, have a per channel average brightness dependency, meaning that each color Red, Green, Blue has an independent characteristic.

CRT's, however, have an additive behavior, meaning that the average brightness depends on the additive brightness of Red, Green, and Blue. "Dynamic Black" displays normally are white level oriented, where white may be defined as min(Red, Green, Blue), as an example. In accordance with embodiments of the present principles, there are average brightness characteristics used during the content production process which are determined to be able to predict/produce a desired color reproduction on target displays. It is assumed that an exact reproduction of the average brightness dependency specification is difficult to realize on the content production side due to the fact that there exist a large variety of such specifications; in fact, each particular model of a display manufacturer may have a different characteristic.

Figure 4:
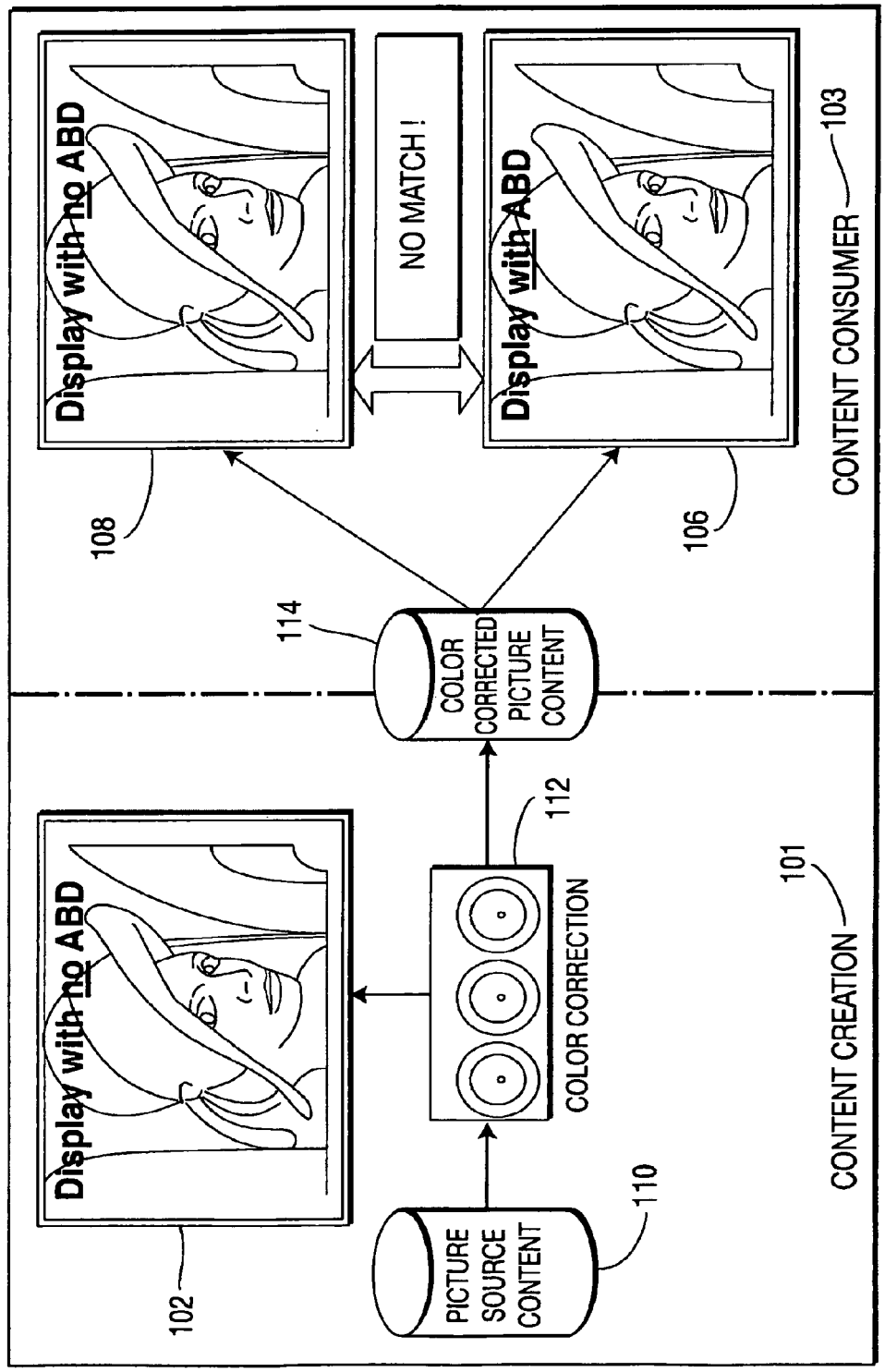
FIG. 4 depicts an illustrative example of a problem in a conventional process of display content creation using consumer display systems.

FIG. 4 depicts an illustrative example of a problem in a conventional process of display content creation using consumer display systems. FIG. 4 includes a content creation side 101 which includes the facilities needed to provide color correction or other adjustments to video content and a content consumer side 103 which includes equipment to view the video content. Referring to FIG. 4, a diagram depicts color correction using a display 102 with no ABD in accordance with a conventional set up. Picture source content 110 is input to a color correction process 112. In conjunction with the color correction process 112, the reference display 102 is used without ABD correction to provide color adjustments to images of the content. Color corrected picture content 114 is then provided to consumers. When color correcting on a display 102 without ABD correction, the colors on a display 106 having ABD will be reproduced incorrectly. For example, if two displays 106 and 108 are compared, both with the same peak brightness, for example, the display 106 with ABD and the display 108 without ABD, pictures with higher brightness will look significantly darker on the display 106 having ABD. Dark pictures, on the other hand, can look the same on both displays 106 and 108. As a result, bright scenes get attenuated versus dark scenes, and as an effect, the color intent may be lost or degraded. Low light components may disappear in brighter pictures, and the visual effect on scene transitions may be degraded.

In some displays, the brightness achieved in a first segment (up to X1) may be significantly higher than the brightness that was achieved with the reference display. The spot sizes for which this brightness can be maintained is rather limited, e.g., X1=5. In this case, all darker scenes experience a significantly higher gain versus displays with no ABD. In this case, when the gain, and thus the opto-electrical transfer function (gamma), is significantly different to the transfer function used in the reference display, a side effect is that picture quantization artifacts and picture compression artifacts become visible which were not visible on the reference display with no ABD.

Figure 5:
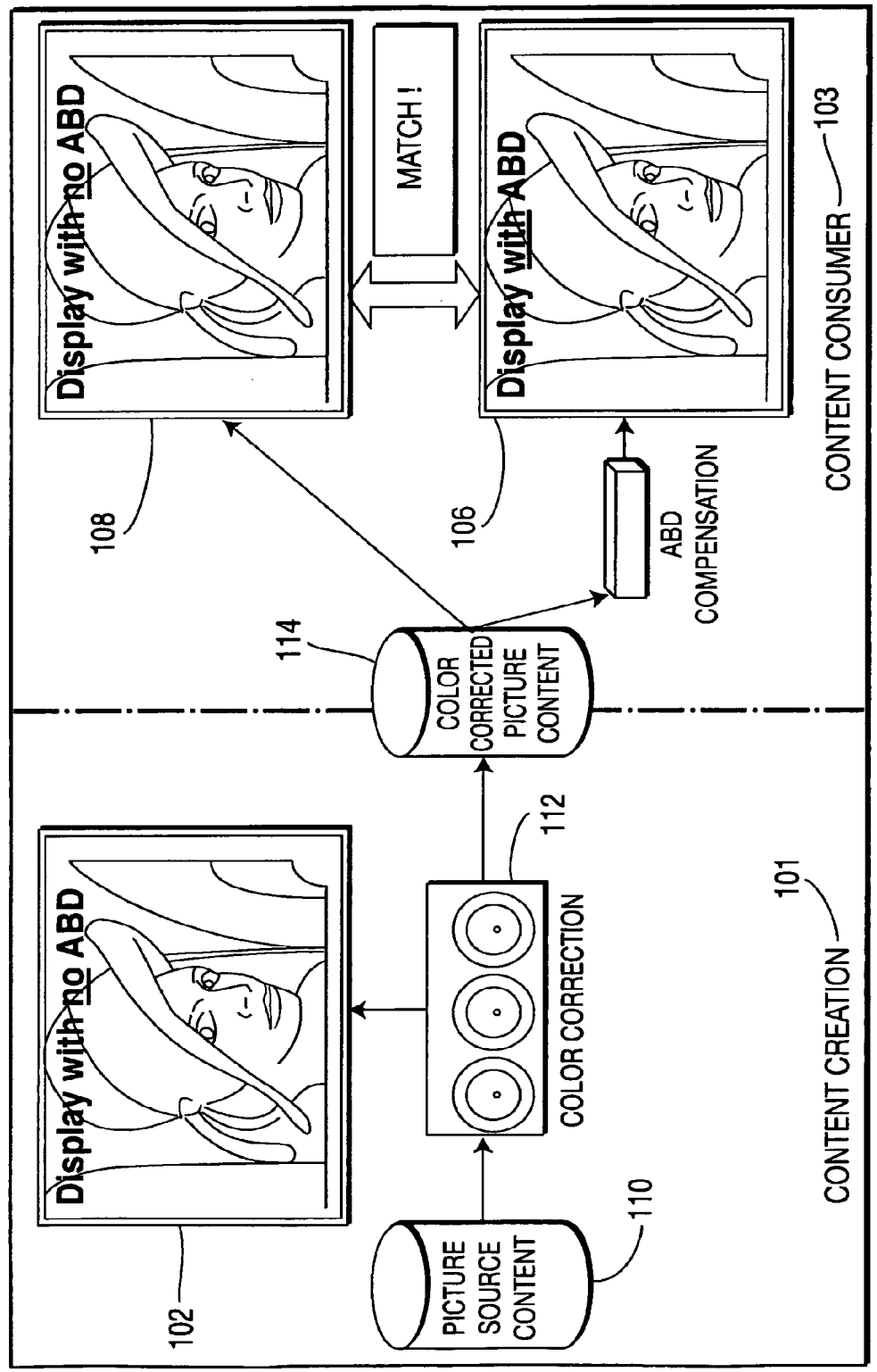
FIG. 5 depicts a block diagram of a process for ABD compensation for a display with different ABD behavior than a reference display in accordance with an embodiment of the present invention.

FIG. 5 depicts a block diagram of a process for ABD compensation for a display with different ABD behavior than a reference display in accordance with an embodiment of the present invention. Referring to FIG. 5, a diagram depicts color correction of a reference display 102 with no ABD. In accordance with one embodiment, an ABD compensation module 202 is used prior to displaying a picture on a consumer display 106 with ABD behavior. One way of retrieving the original look of the picture may include compensating for the ABD of the display 106 by applying an inverse characteristic in the ABD compensation module 202 and then routing the resultant signal to the display 106 with ABD. This solution may have the drawback that a display with ABD may provide a very poor display image when all ABD is compensated out. There may either be a lot of clipping artifacts introduced by this solution, when retaining the dynamic range of the display, or, in another case, when the peak white is set equal to the minimum peak white for all spot sizes, the dynamic range will be really low, and quantization problems are likely to become apparent since only parts of all code values will be used.

In accordance with an embodiment of the present invention, the compensation module 202 can include the ability to determine the type of reference display 102 where the color corrected picture content 114 was produced. As such, the inverse characteristic is referenced for the display type of display 106. Next, the inverse characteristic is applied to compensate for the ABD not present in the referenced display 102 to provide a better match between the reference display 102 and the content consumer display 106. It should be understood that while the figures include a content creation side 101 and a content consumer side 103, the elements depicted on the content consumer side 103 can be implemented on the content creation side 101 and vice versa. In addition, content creation 101 can include production facilities for rendering video for cable or other networks, television, movie studios, DVD's, VHS tapes or any other content production. The content consumer 103 can include movie theatres, televisions, or any other content consumer. The determined ABD information in accordance with various embodiments of the present invention can be embodied in a look up table, analytical transfer function, data graph or any other relationship between spatial resolution and brightness. It should be kept in mind however, that the color correction process provides changes to the ABD information. As such, alternatively, ABD compensation can be performed by comparing ABD information between the consumer display (106) and the reference display 102 and compensating for the differences to achieve the same or similar result as the reference display 102.

ABD on a plasma display, for example, can be defined according to Equation two (2), which follows:

$ABD_{out}(ABD_{Act})=(Y1+(Y2-Y1)(1/(ABD_{Act}-ABD1))/\max(Y1,Y2)$ for all spot sizes $ABD_{act}$ above minimum spot size ABD1, and constant for all $ABD_{act}$ below or equal to ABD1.

More generally:

$$ABD_{out}(ABD_{Act})=(Y1+(Y2-Y1)f_{abd}(ABD_{Act}-ABD1)/\max(Y1,Y2). \quad (2)$$

In the embodiment described above, there are three color components, and in one exemplary embodiment, there is assumed to be no correlation between the three color components. To simulate an ABD on a display with no ABD, however, the video signals can be modified by means of a mathematical function or by means of a LUT (Look-Up Table). Such a modification is explained with reference to the system of FIG. 6.

Figure 6:
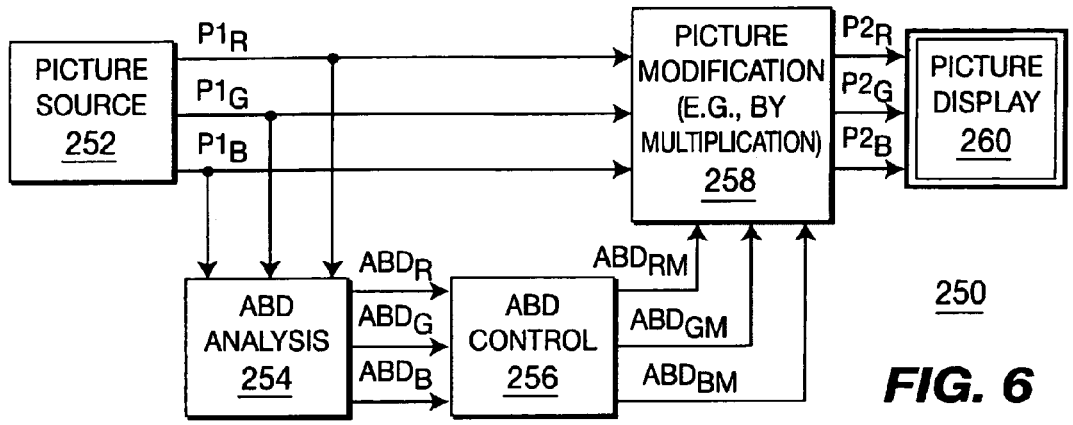
FIG. 6 depicts a high level block diagram of an ABD simulation unit in accordance with one embodiment of the present invention.

FIG. 6 depicts a high level block diagram of an ABD simulation unit in accordance with one embodiment of the present invention. Referring to FIG. 6, an ABD simulation unit 250 is illustratively depicted, (which can be used for simulation module 302 or 604, as will be described below). In FIG. 6, a source picture 252 includes a Red component, $P1_R$, a Green component, $P1_G$, and a Blue component, $P1_B$. In the embodiment of the invention of FIG. 6, the P1 components are analyzed for average brightness for each color component in an ABD analysis block 254. The average brightness can be characterized according to equation three (3), which follows:

$$ABD_R = \frac{\sum_{\substack{x=1 \\ y=1}}^{\substack{x=HSIZE \\ y=VSIZE}} (P1_R(x,y) - P1_{Rmin})*100}{(HSIZE*VSIZE*(P1_{Rmax} - P1_{Rmin}))} \quad (3)$$

0 [$ABD_R$ [100, where HSIZE is equal to the horizontal size of the picture and VSIZE is equal to the vertical size of the picture. $P1_{R\,min}$ depicts the minimum red component of the source picture and $P1_{R\,max}$ depicts the maximum red component of the source picture. The values for $ABD_G$, and $ABD_B$ are obtained the same way by calculating the global average out of $P1_G$, and $P1_B$, respectively.

In the ABD control block 256, a target ABD function is applied, and a resultant multiplication factor is produced, one for each color component ($ABD_{R\,M}$, $ABD_{G\,M}$, $ABD_{B\,M}$). An exemplary target function as described in Equation 1, above, is applied per color component. Following the theory of a three segmented function, it needs specification of one set of brightness references, Y1, Y2, and ABD1, ABD2 spot sizes (=average brightness levels), but also of the function that $ABD_{out}$ follows depending on $ABD_{Act}$, Y1, Y2, ABD1, and ABD2. A picture modification device 258, then, applies the ABD multiplication factor to the picture, either by means of, in one embodiment, simple multiplication, or by a more complex function, or Look-Up Tables. The ABD compensation ($P2_R$, $P2_G$, $P2_B$) is, as such, provided to a respective picture display 260 (e.g., display 106 of FIG. 5, for example).

Figure 7:
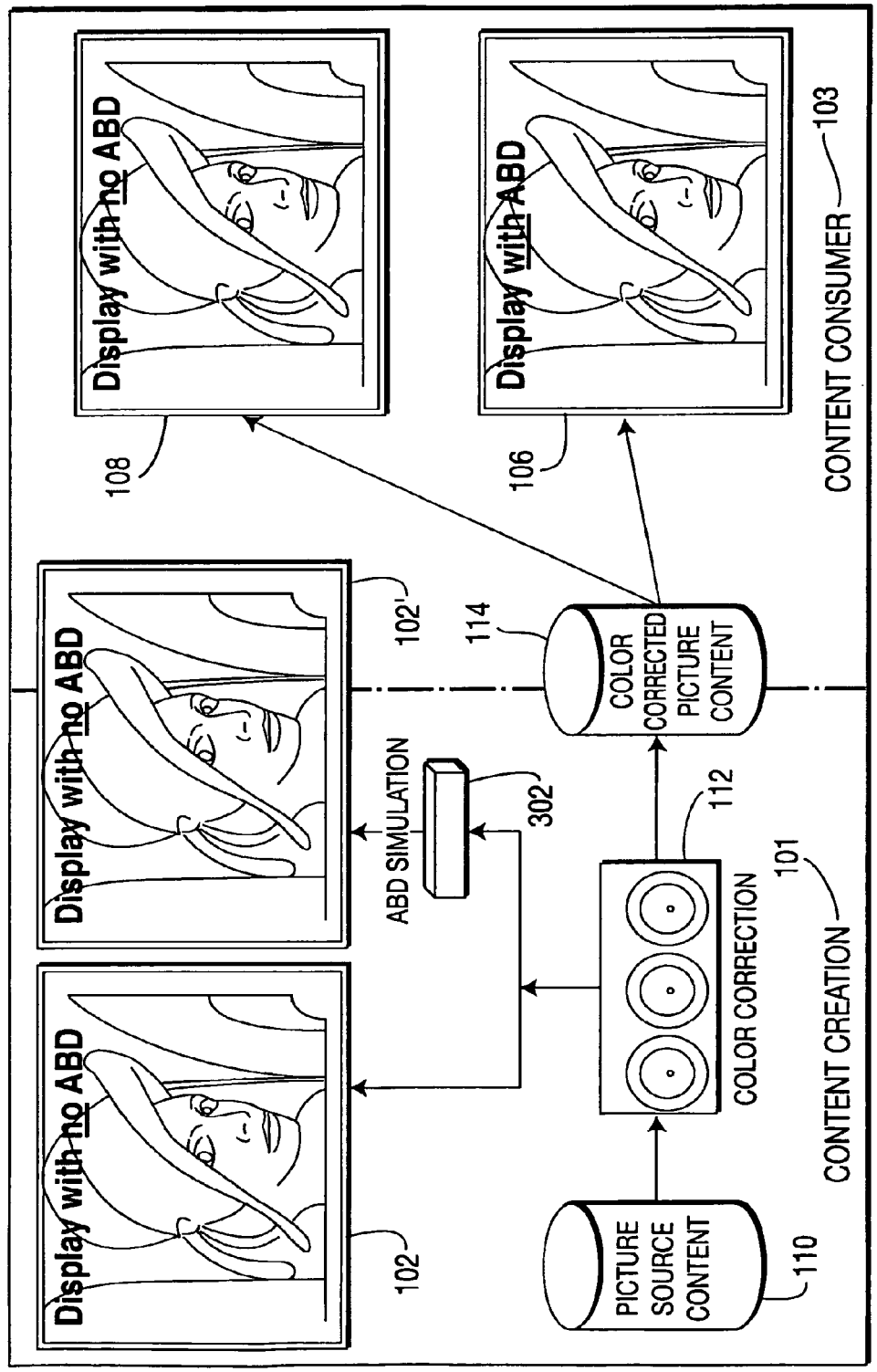
FIG. 7 depicts a block diagram of a process for ABD simulation to provide correction for a plurality of displays with different ABD behaviors in accordance with an embodiment of the present invention.

FIG. 7 depicts a block diagram of a process for ABD simulation to provide correction for a plurality of displays with different ABD behaviors in accordance with an embodiment of the present invention. Referring to FIG. 7, a system for predicting variations in color reproduction between displays with and without ABD during the content creation process is illustratively depicted. As such, the composition on a display is known during content production and compensation for ABD variances can applied on the content creation side 101 of the process. Predicting the color variations between displays with ABD 106 and displays without ABD (102 and 102') during the content creation process enables the color composition on a consumer display 106 to be known even during content creation 101 and compensation can be applied using an ABD simulation module 302 in accordance with the present invention.

Differences in the look of images presented on displays with ABD versus displays with no ABD and/or displays with different types of ABD, during content creation, can be predicted, and color decisions can be made to make sure that the artistic intent is not compromised by one of the displays taken into consideration in accordance with the present invention. More specifically, in one embodiment of the present invention a best compromise for all displays can be determined and implemented using a master content source 114. This can mean that not all desired color compositions are possible on all displays even though some displays would have the potential to support them. The resultant picture material 114 would be color corrected to meet the least common denominator among all displays expected to be employed.

In one embodiment, reference display 102, which employs ABD and is used during content creation, could be a reference display of a given type with well characterized and documented characteristics, or display 102 could be a reference display of another type, for example, with no ABD (as shown in the FIG. 7), with ABD simulation circuitry 302. The advantage of a reference with no ABD, however, is in the possibility of viewing different display characteristics on one display without the need of an arrangement of several displays for color correction.

In one embodiment, during content creation 101, reference display 102 which is affected by ABD is compared to a different reference display 102' with no ABD effects. In this embodiment, the simulation module 302 includes the capability of adjusting the ABD of display 102' to arrive at a satisfactory picture reproduction. The adjustments made in the simulation module 302 can be employed to create an inverse characteristic curve or a new ABD setting to be used with consumer displays (e.g., display 106 in FIG. 7) of the same type as the reference display 102'. As previously described however, the displays 102 and 102' can be the same display type with different ABD characteristics, different display types with the same ABD or different display types with different ABD. Advantageously, using the simulation circuitry 302 in this way offers the opportunity of having different display characteristics on one display without the need of an arrangement of several displays in a color correction process.

Figure 8:
FIG. 8 depicts an illustrative example of a split screen for displaying multiple reference images in accordance with an embodiment of the present invention.

FIG. 8 depicts an illustrative example of a split screen for displaying multiple reference images in accordance with an embodiment of the present invention. As shown in FIG. 8, a split screen display 402 can be provided for comparing the two display characteristics on a single display. Display 402 can include a partial screen 404 which employs a first ABD characteristic (or lack thereof) and a second partial screen 406 that employs a different ABD characteristic (or lack thereof). The split screen display 402 provides a very practical solution since a side-by-side comparison between different settings can be performed. In alternate embodiments of the present invention, however, a screen 402 can be segmented into any number of partial screens more than two. Using the embodiment of FIG. 8, however, it is possible to use a split screen display to compare two display characteristics on one display.

Figure 9:
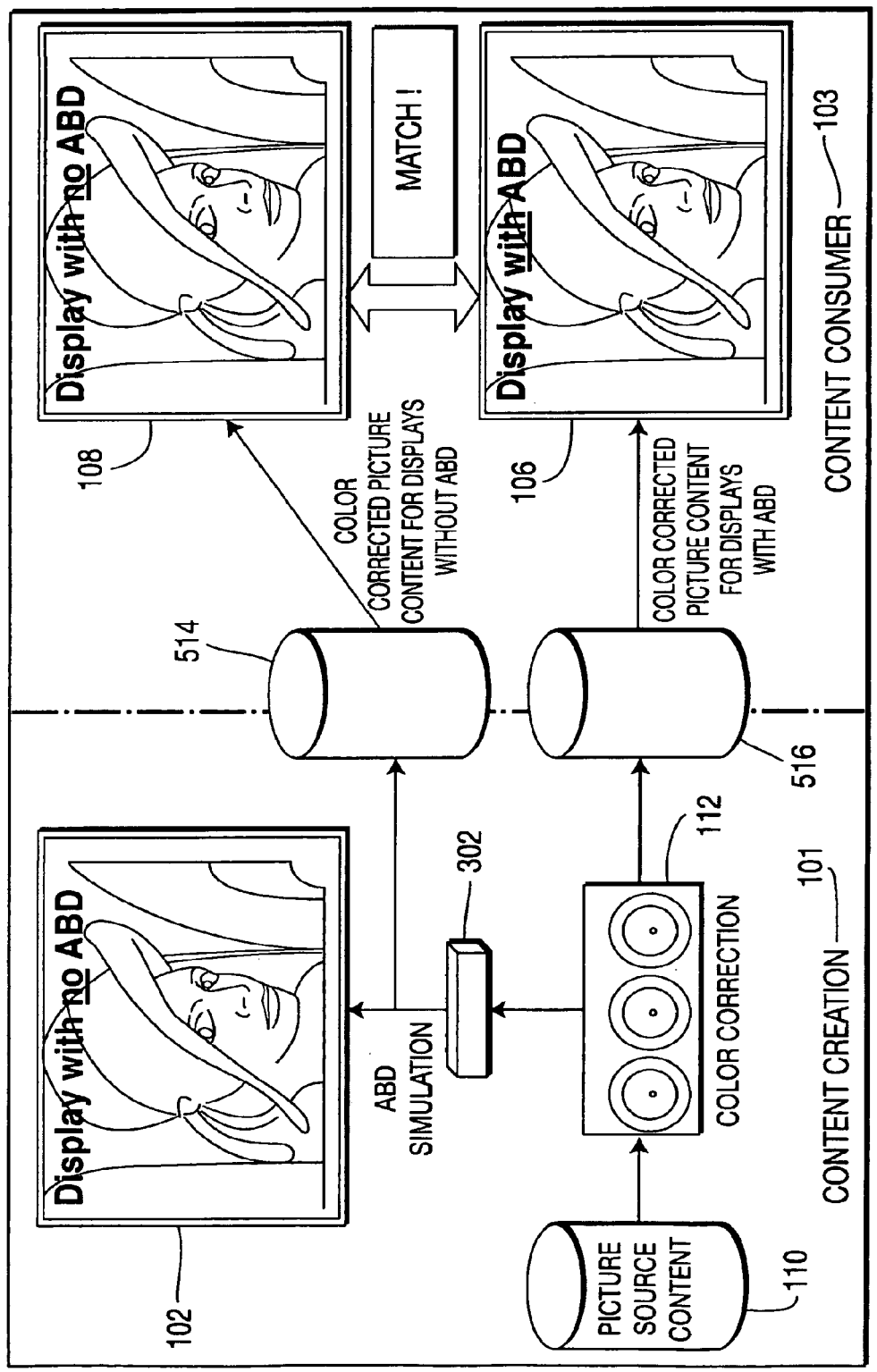
FIG. 9 depicts a block diagram of a process for ABD simulation for providing at least two masters for displays with similar and different ABD behaviors in accordance with an embodiment of the present invention.

FIG. 9 depicts a block diagram of a process for ABD simulation for providing at least two masters for displays with similar and different ABD behaviors in accordance with an embodiment of the present invention. Referring to FIG. 9, an ABD specification is employed during color correction (112), resulting in two masters: one master (color corrected picture content) 516 for displays 106 with ABD, and one master (color corrected picture content) 514 for displays without ABD. Here, the color correction 112 is actually done on the master 516 with ABD, and the master 514 with no ABD will be a derivative of master 516 using ABD simulation module 302.

Good results can be achieved with this embodiment. Good color matching can be achieved between a consumer ABD display 106 and a non-ABD display 108 provided that the ABD specifications of master 514 and master 516 match with the specification needed for displays in the field, or the display in the field is calibrated to the specification used in the color correction process 112.

However, there is a singular specification for a display with no ABD, and yet multiple ABD specifications will have to be considered for the ABD versions. It would be advantageous if the parent version were the version with no ABD. In addition, the color correction process 112 can be a bit labor intensive since the colors are modified before any ABD is applied, because the simulation module or circuitry 302 is disposed between the color correction 112 and the reference display 102. A colorist in a content creation facility can, for example, raise the contrast of a picture, but the ABD simulation can work against this and reduce the contrast. Advantageously, in contrast with the embodiment of FIG. 7, there will be no colors in the master 516 that cannot be displayed by a display 106 with ABD.

Figure 10:
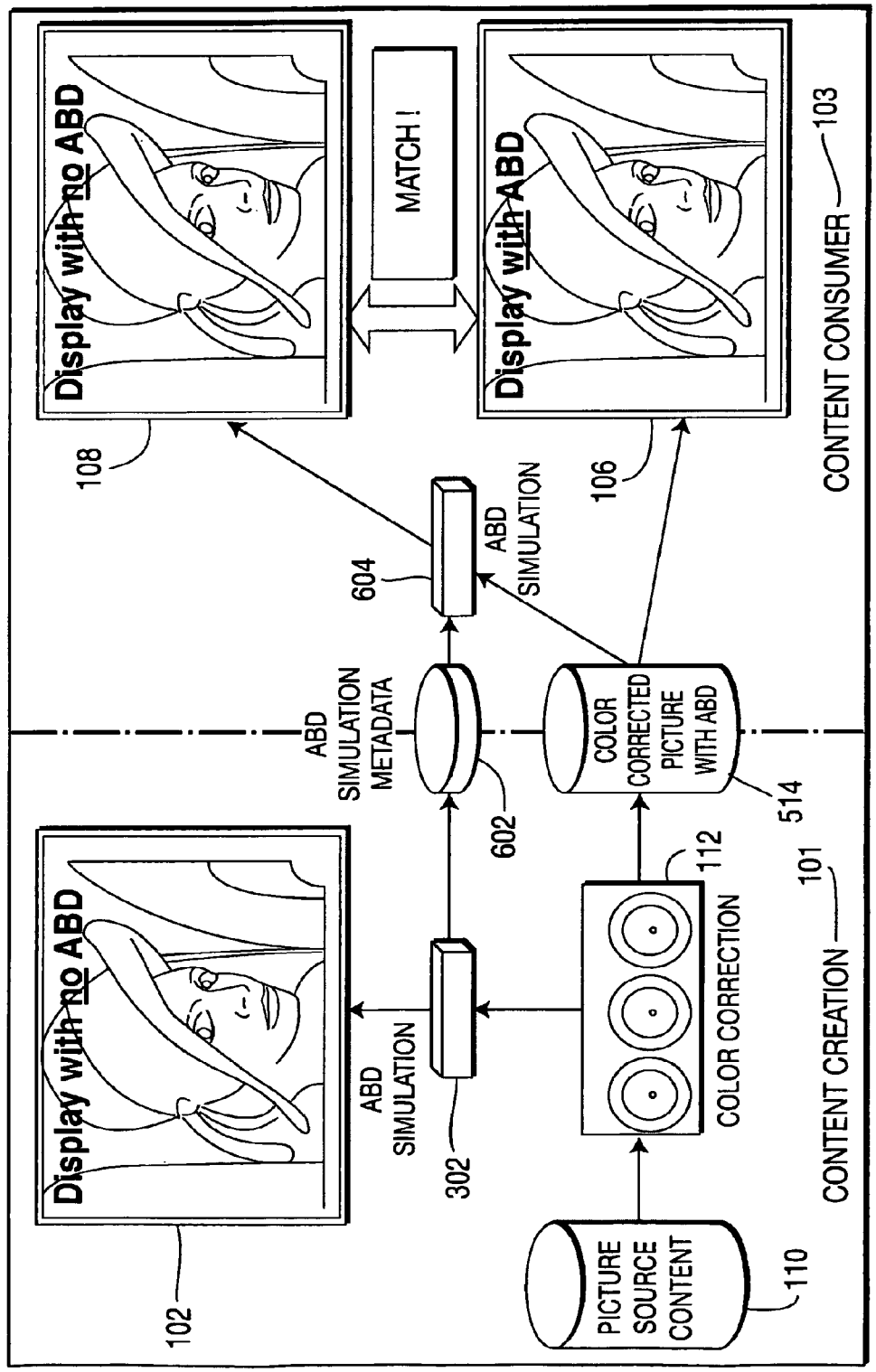
FIG. 10 depicts a block diagram of a process for ABD simulation for providing correction for a plurality of displays with different ABD behaviors using metadata from a simulation process in accordance with an embodiment of the present invention.

FIG. 10 depicts a block diagram of a process for ABD simulation for providing correction for a plurality of displays with different ABD behaviors using metadata from a simulation process in accordance with an embodiment of the present invention. Referring to FIG. 10, another embodiment is depicted where display 106 has ABD behavior while the reference display 102 does not. In addition, display 108 has no ABD behavior. Color correction 112 provides color corrected content (514) for displays with ABD and displays without ABD. ABD simulation 302 is performed using reference display 102 without ABD during color correction. This results in one master 514 for displays with average brightness dependency (ABD). Simulation module 302 outputs metadata 602 describing a transformation of the picture with ABD into a picture without ABD. As described above, it follows the theory of a three segmented ABD, with two flat regions and one variable region in between, therefore the metadata 602 can describe the thresholds in average brightness and the corresponding absolute brightnesses, plus a description of the function in between. In one embodiment of the present invention, a function description can be a parameter that indexes different functions, such as a linear function, an 1/x function, or the like.

Based on an ABD description as depicted in FIG. 2 or 3, for example, a list of illustrative parameters that can be transmitted as metadata 602 can be characterized according to Table 1, which follows:

TABLE 1

Examples of Metadata

| Parameter | Description | Value |
|---|---|---|
| X1 = ABD1 | Threshold that determines the lower threshold for ABD (as defined in Eq. 3), below which there is no change in picture brightness by the average brightness of the picture. | Value between 0 and 100. 0 for a very dark picture, 100 for a picture with very high average brightness. |
| X2 = ABD2, | Threshold that determines the upper threshold for ABD (as defined in Eq. 3), above which there is no change in picture brightness by the average brightness of the picture. | 0 for a very dark picture, 100 for a picture with very high average brightness. Display of technology type Plasma or CRT do not have this segment, in which case the X2 = ABD2 = 100. However, displays of technology type LCD with "dynamic black" feature typically do have such a segment, therefore X2 = ABD2 < 100. |
| Y1 | Relative brightness level in percent. Brightness level after ABD for ABD's < ABD1 | For displays of technology type Plasma or CRT, ABD typically does not modify the brightness in this segment, therefore Y1 = 100. However, displays of technology type LCD with "dynamic black" feature typically modify brightness in this segment, therefore Y1 < 100 |
| Y2 | Relative brightness level in percent. Brightness level after ABD for ABD's > ABD2 | For displays of technology type LCD with "dynamic black" feature, ABD typically does not modify the brightness in this segment, therefore Y2 = 100. However, displays of technology type Plasma or CRT typically modify brightness in this segment, therefore Y2 < 100 |

TABLE 1-continued

Examples of Metadata

| Parameter | Description | Value |
|---|---|---|
| FUNC_SEL | Selection flag for analytical function ($f_{abd}$ of Eq. 2) | Examples:<br>FUNC_SEL = 0 for $f_{abd}(x) = 1/x$<br>FUNC_SEL = 1 for $f_{abd}(x) = x$ |
| CORR_SEL | Correlation Flag, determines inter-channel dependency of average brightness dependency | CORR_SEL = 0: Every color channel is treated independently,<br>CORR_SEL = 1: The channel with the most effect to ABD determines the ABD for all channels,<br>CORR_SEL = 2: The channel with the least effect to ABD determines the ABD for all channels,<br>CORR_SEL = 3: for ABD, an average of all channels is used.<br>CORR_SEL = 4: for ABD, a weighted average (weight (w)) of all channels is used, $ABD_{out} = \frac{1}{3} * (w_r * ABD_{out\,r} + w_g * ABD_{out\,g} + w_b * ABD_{out\,b})$ |
| $w_r$ | Weighting Factor for the Red channel for CORR_SEL = 4 | 0 ... 1 |
| $w_g$ | Weighting Factor for the Green channel for CORR_SEL = 4 | 0 ... 1 |
| $w_b$ | Weighting Factor for the Blue channel for CORR_SEL = 4 | 0 ... 1 |

Additional metadata or a variety of different forms of metadata can be used to address other and more complex ABD characteristics. Other metadata formats can also be applied, such as, for example, multi-dimensional Look Up Tables. An ABD simulation module 604 transforms input from the single master 514 to provide ABD simulation signals which permit a match in display images between displays 106 and 108.

Advantageously, a single inventory master 514 is provided, and metadata 602 describing the difference between the colors for a display with ABD and a display without ABD are provided. A color transform described by the metadata is similar to the color transform defined by the reference ABD specification for display 102.

Figure 11:
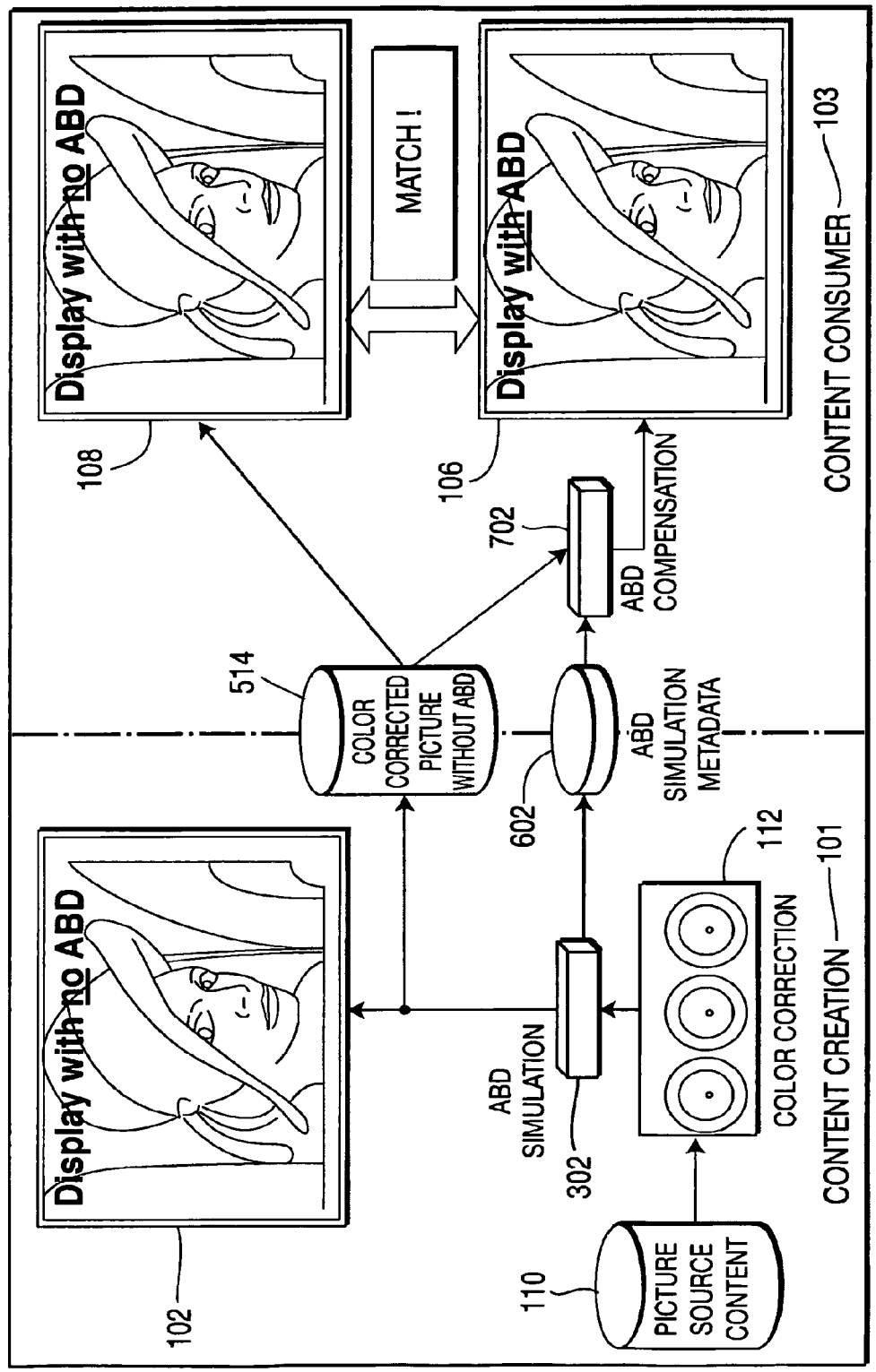
FIG. 11 depicts a block diagram of a process for ABD simulation for providing correction information through metadata to an ABD compensation module for displays with ABD behavior different from a reference display in accordance with an embodiment of the present invention.

FIG. 11 depicts a block diagram of a process for ABD simulation for providing correction information through metadata to an ABD compensation module for displays with ABD behavior different from a reference display in accordance with an embodiment of the present invention. Referring to FIG. 11, in this embodiment, the display 106 includes ABD behavior which is compensated for by an ABD compensation module 702 in accordance with the present invention. The display 106 has different behavior from the reference display 102 (which has no ABD). The color correction process 112 adjusts the reference display 102 to make the picture suitable for the display 106 with ABD. This is performed using ABD simulation module 302. The simulation results in one master 514 for displays 108 without ABD behavior like the reference display 102. In addition, metadata 602 describing a transformation of the picture for use on the display 106 with ABD is provided. The metadata 602 may be, for example, a description of an inverse transform of the ABD simulation transform (from ABD simulation 302) used for color correction. The metadata 602 can be employed by the compensation module 702 that applies the inverse of the function specified by the metadata to the picture content 514 to produce a matching image result to display 108 (or with the reference display 102). The difference between the embodiment shown in FIG. 11 and the embodiment shown in FIG. 10 is that the single inventory master 514 is based on a display without ABD behavior.

Using the example of Eq. 1, the inverse function can be characterized according to equation four (4), which follows:

$$ABD_{Act} = (Y2-Y1)/(ABD_{out}-Y1) + ABD1, \qquad (4)$$

where $ABD_{Act}$ is the input ABD value of the display and $ABD_{out}$ is the output ABD value of the ABD display.

Figure 12:
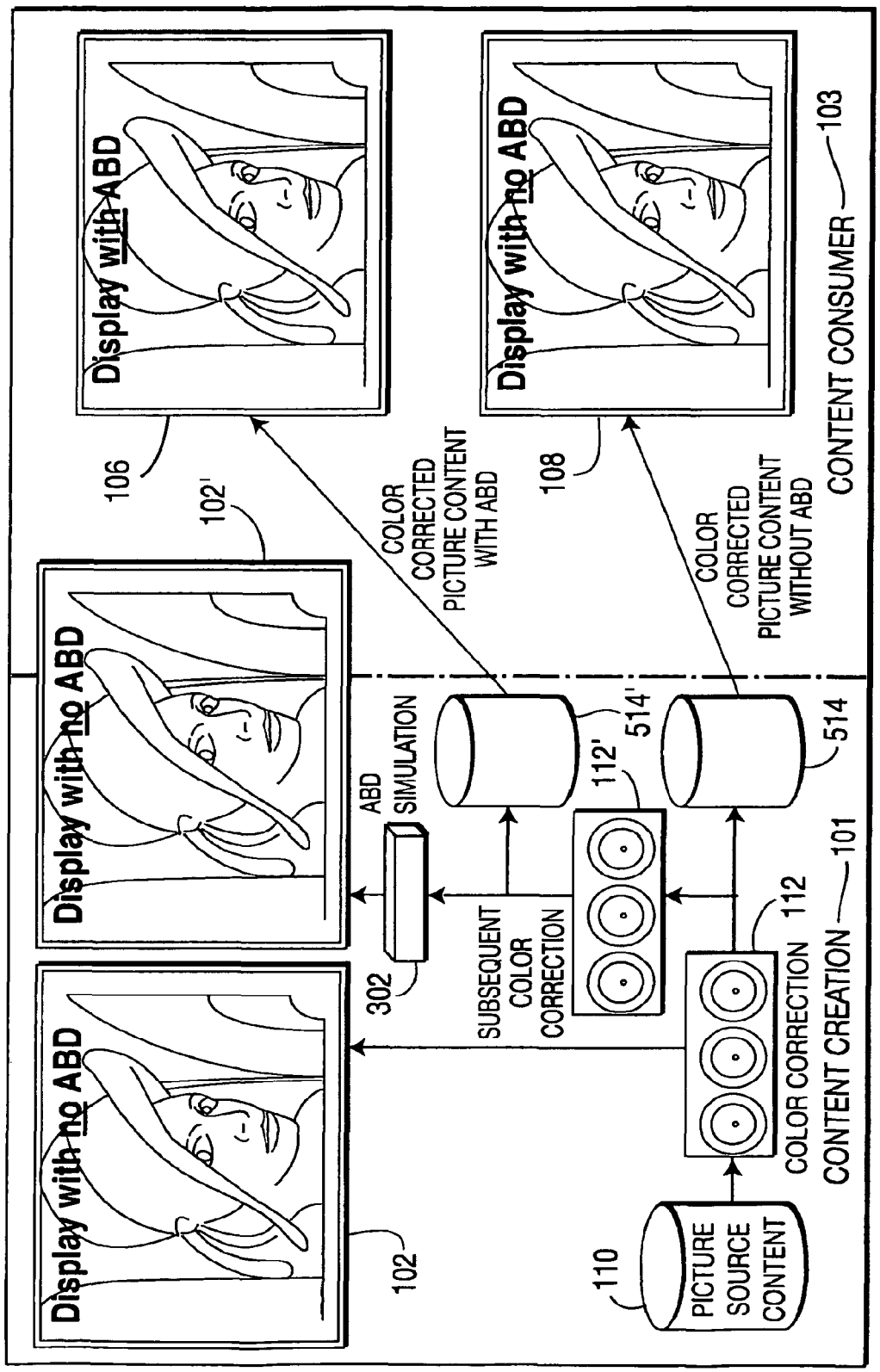
FIG. 12 depicts a block diagram of a process for ABD simulation based on a subsequent color correction process using an additional reference display to generate one master and provide correction for a display with different ABD behavior and a second master created by a previous color correction process for a display with the same ABD behavior in accordance with an embodiment of the present invention.

FIG. 12 depicts a block diagram of a process for ABD simulation based on a subsequent color correction process using an additional reference display to generate one master and provide correction for a display with different ABD behavior and a second master created by a previous color correction process for a display with the same ABD behavior in accordance with an embodiment of the present invention. Referring to FIG. 12, in this embodiment, one master is provided for displays without ABD in a first color correction process, and a subsequent color correction is used to create a secondary master for displays with ABD. Picture source content 110 is color corrected by color correction process 112 using the reference display 102. The color corrected picture content is forwarded to create a first master 514 for displays without ABD behavior. A subsequent color correction is provided using reference display 102' by a color correction process 112' for creating a secondary master 514' for displays 106 with ABD behavior where the ABD behavior is adjusted to match the reference display 102' by using the simulation module 302 to make adjustments.

In the embodiment of FIG. 12, a two step color correction is advantageously performed. In a first step, color correction 112 is applied where the colors are corrected for the reference display 102 with no ABD behavior. Then, the picture is put onto the display 102' with no ABD behavior and a simulation is performed to adjust for display 106 with ABD behavior. In the secondary color correction process 112', the colorist is given the ability to adjust the colors and parameters in a way to preserve artistic intent on the display 106 with ABD behavior using reference display 102'. However, in this scenario it is accepted that the two versions of the picture for display 106 and display 108 will not match exactly, but will preserve artistic intent. The two versions can then be stored as separate masters 514 and 514'.

Figure 13:
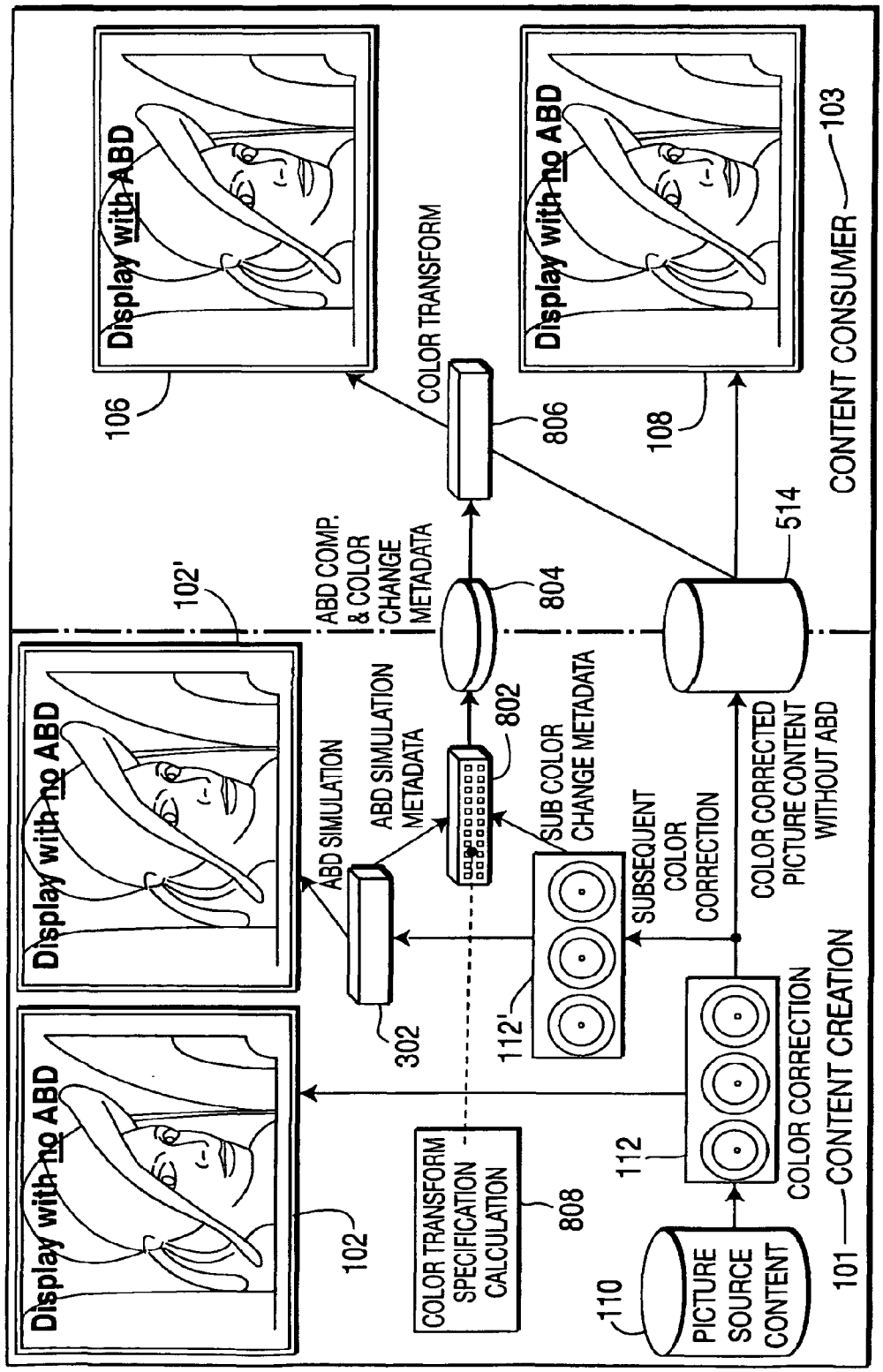
FIG. 13 depicts a block diagram of a process for ABD simulation based on a subsequent color correction process using an additional reference display to generate one master and provide correction for a display with different ABD behavior by computing a color transform based on simulation metadata and color correction metadata and a second master created by a previous color correction process for a display with the same ABD behavior in accordance with an alternate embodiment of the present invention.

FIG. 13 depicts a block diagram of a process for ABD simulation based on a subsequent color correction process using an additional reference display to generate one master and provide correction for a display with different ABD behavior by computing a color transform based on simulation metadata and color correction metadata and a second master created by a previous color correction process for a display with the same ABD behavior in accordance with an alternate embodiment of the present invention. Referring to FIG. 13, in this embodiment, one master is preferably created for displays without ABD, and a subsequent color correction creates a second version for displays with ABD. Instead of creating two masters, a color transform is calculated using the subsequent color transform information and the ABD simulation specification. The combined metadata is provided to the consumer device which is then able to reconstruct the version for displays with ABD using a color transform that uses the color transform specification.

As shown in FIG. 13, one master 514 is created for displays 108 with no ABD behavior based on the reference display 102. This master 514 is created by a color correction process 112. A subsequent color correction process 112' is performed on the output of the first color correction process 112 for creating a second version for displays 106 with ABD behavior based on color decisions made using the reference display 102'. Instead of creating two masters, a color transform 806 is calculated using the subsequent color correction process 112' transform information. The transform information can be generated from simulation module 302 and/or from the color correction process 112' of reference display 102', which is the same or similar to display 106.

A color transform specification calculation 808 is performed to generate ABD compensation and color change metadata 804. The combined metadata 804 would then be provided to a consumer device in the form of the color transform 806 which is then able to reconstruct the version for displays with different ABD behavior in accordance with behavior of the reference display 102' using a signal transform that uses the color transform specification 806.

In some applications, it may not be preferable to have separate or multiple masters for different ABD characteristics or different display types. In such cases, it is preferable to have a single source of content and metadata describing a color transform 806 that is necessary to retrieve the characteristic version needed. On the consumer side, color transform 806 (which can be implemented as a circuit or in software) can be provided which connects a signal source with a display (106) with an ABD behavior different from the ABD behavior of the reference display 102. This transform 806 can be implemented in hardware or in software, and can provide the signal transform to generate the version of ABD specification needed out of the signal for displays with ABD. In one embodiment of the present invention, the transform 806 can be provided with the signal transform specification from the content provider by means of metadata 804. The signal transform specification from transform 806 includes two major components, a specification of the color change from the subsequent color correction, and a specification of an ABD compensation (by inverting the ABD simulation specification used during color correction). Since it may not be desirable to have separate masters for different ABD situations, it is preferable to have one parent or main content and metadata describing the color transform that is necessary to retrieve the ABD version needed.

Figure 14:
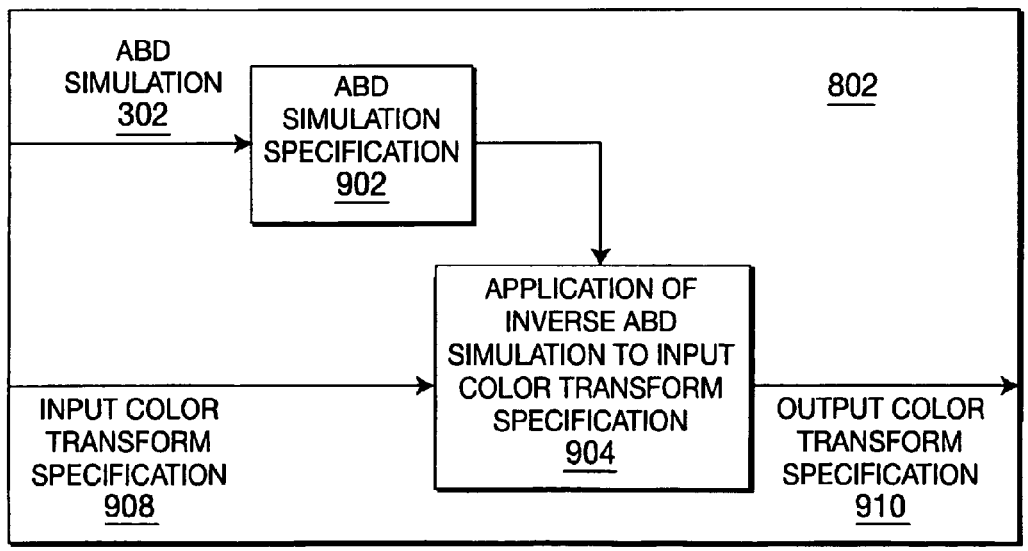
FIG. 14 depicts a high level block diagram of a module for computing a color transform specification in accordance with an embodiment of the present invention.

FIG. 14 depicts a high level block diagram of a module for computing a color transform specification in accordance with an embodiment of the present invention. FIG. 14 depicts an embodiment of a module 802 that combines the two components used to create a color transform 806. A signal transform specification 910 is output to color transform 806 after two major component signals are combined. These components include an input color transform specification 908 for color changes from the subsequent color correction, and ABD simulation information from ABD simulation 302. This includes an ABD specification 902 for ABD compensation. An output color transform specification 910 is derived in block 904 by creating ABD compensation, for example, by inverting the ABD simulation specification used during color correction and applying the inverse ABD simulation specification to the input color transform specification 908. To further explain this, a color change (cc) can be characterized according to equation five (5), which follows:

$$R_{cc} = f_{cc\_r}(R_{in}, G_{in}, B_{in})$$

$$G_{cc} = f_{cc\_g}(R_{in}, G_{in}, B_{in})$$

$$B_{cc} = f_{cc\_b}(R_{in}, G_{in}, B_{in}), \quad (5)$$

where $f_{cc}$ is a color change function for a particular color channel (r, g, b) based on input values for $R_{in}$, $G_{in}$, $B_{in}$. For ABD, the resultant color change can be characterized according to equation six (6), which follows:

$$R_{cc\_abd} = f_{abd\_r}(f_{cc\_r}(R_{in}, G_{in}, B_{in}))$$

$$G_{cc\_abd} = f_{abd\_g}(f_{cc\_g}(R_{in}, G_{in}, B_{in}))$$

$$B_{cc\_abd} = f_{abd\_b}(f_{cc\_b}(R_{in}, G_{in}, B_{in})), \quad (6)$$

with component color change ($C_{cc}$) being $C_{cc} = CC \times C_{in}$ where CC is a color matrix characterized according to equation seven (7), which follows:

$$CC = \begin{bmatrix} c11 & c12 & c13 \\ c21 & c22 & c23 \\ c31 & c32 & c33 \end{bmatrix} \quad (7)$$

As such, outputs $[R_o; G_o; B_o] = CC^*[R_i; G_i; B_i]$, and $R_o = c11^*R_i - c12^*G_i + c13^*B_i$. Therefore, each color component can be determined as follows:

$$R_{cc\_abd} = f_{abd\_r}([R_{in}; G_{in}; B_{in}]^*[c11 \; c12 \; c13])$$

$$G_{cc\_abd} = f_{abd\_g}([R_{in}; G_{in}; B_{in}]^*[c21 \; c22 \; c23])$$

$$B_{cc\_abd} = f_{abd\_b}([R_{in}; G_{in}; B_{in}]^*[c31 \; c32 \; c33])$$

$R_{cc\_abd} =$ $Y1_r^*[R_{in}; G_{in}; B_{in}]^*[c11 \; c12 \; c13]$ for $ABD_{act\_r}[ABD1_r$ $ABD_{out\_r}(ABD_{act\_r})/\max(Y1_r, Y2_r)^*[R_{in}; G_{in}; B_{in}]^*[c11 \; c12 \; c13]$ for $ABD1_r[ABD_{act\_r}[ABD2_r$.

$Y2_r^*[R_{in}; G_{in}; B_{in}]^*[c11 \; c12 \; c13]$ for $ABD2_r[ABD_{act\_r}$.

$G_{cc\_abd} =$ $Y1_g^*[R_{in}; G_{in}; B_{in}]^*[c21 \; c22 \; c23]$ for $ABD_{act\_g}[ABD1_g$ $ABD_{out\_g}(ABD_{act\_g})/\max(Y1_g, Y2_g)^*[R_{in}; G_{in}; B_{in}]^*[c21 \; c22 \; c23]$ for $ABD1_g[ABD_{act\_g}[ABD2_g$.

$Y2_g^*[R_{in}; G_{in}; B_{in}]^*[c21 \; c22 \; c23]$ for $ABD2_g[ABD_{act\_g}$.

-continued $B_{cc\ abd} =$ $Y1_b^*[R_{in}; G_{in}; B_{in}]^*[c31\ c32\ c33]$ for $ABD_{act\ b}[ABD1_b$ $ABD_{out\ b}(ABD_{act\ b})/\max(Y1_b, Y2_b)^*[R_{in}; G_{in}; B_{in}]^*[c31\ c32\ c33]$
for $ABD1_b[ABD_{act\ b}[ABD2_b]$.

$Y2_b^*[R_{in}; G_{in}; B_{in}]^*[c31\ c32\ c33]$ for $ABD2_b[ABD_{act\ b}$.

In another exemplary application where both the ABD specification 902 and the input color transform 908 are implemented as Look Up Tables (LUTs), the resultant color transform specification 910 will be a Look Up Table produced by inverting the Look Up Table that described the ABD characteristic used during color correction. This Look Up Table is then concatenated with a Look Up Table generated from the color transform, where the color correction transform comes first followed by the ABD compensation.

In accordance with the present principles, it is often discriminated between a picture version for displays with ABD and a picture version for displays without ABD, or metadata for reconstructing the picture for displays with ABD. As mentioned above, there are several ABD specifications to be addressed, e.g., at least one for the CRT and Plasma kinds of behavior, and at least one for the "dynamic black" type of behavior.

Having described preferred embodiments for systems and methods for compensating for average brightness dependency (ABD) differences between displays with and without average brightness dependency (ABD) (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for compensating for average brightness dependency (ABD) differences between displays, comprising:
 color correcting source picture content on a reference display to produce color corrected picture content; and
 applying an ABD compensation characteristic to the color corrected picture content for displaying said source picture content on a display with different ABD characteristics than the reference display;
 wherein the color correcting and the applying of the ABD compensation characteristic are performed by at least one processor; and the applying of the ABD compensation characteristic includes applying an inverse function of an ABD specification.

2. The method of claim 1, further comprising determining ABD settings that are acceptable for a plurality of display types using a single master for the color corrected picture content.

3. The method of claim 1, wherein said source picture content is displayed on a plurality of reference displays and color correction is performed for the plurality of reference displays to determine an ABD specification for simulating a display with different ABD behavior.

4. The method of claim 3, wherein the plurality of reference displays include respective split screens.

5. The method of claim 1, further comprising generating multiple master copies for the color corrected picture content.

6. The method of claim 5, wherein the multiple master copies for the color corrected picture content include one master generated by the color correcting step and one master generated by applying the ABD compensation characteristic.

7. The method of claim 1, wherein ABD compensation characteristics are determined by generating metadata based upon color correction settings, the metadata being transmitted to an ABD simulator for application to said source picture content for correctly displaying said source picture content on a display with different ABD characteristics than the reference display.

8. The method of claim 1, comprising performing a first color correction process for providing color corrected picture content for a display with first ABD characteristics different from said reference display, and performing a second color correction process to provide color corrected picture content for a display with second ABD characteristics different from the reference display.

9. A system for compensating for average brightness dependency (ABD) differences between displays, comprising:
 a color correction unit comprising at least one processor configured to color correct source picture content on a reference display to produce color corrected picture content;
 a simulation unit comprising at least one processor configured to receive the color corrected picture content and to simulate, on a first display with ABD characteristics different from the reference display, the look of the corrected source picture content on the reference display; and
 a compensation unit comprising at least one processor configured to receive the color corrected picture content and information from the simulation unit and to apply an ABD compensation characteristic to the color corrected picture content for displaying said source picture content on a second display with different ABD characteristics than the reference display.

10. The system of claim 9, wherein the simulation unit outputs color corrected picture content to a third display with ABD characteristics that are the same as the reference display.

11. The system of claim 9, wherein the simulation unit outputs color corrected picture content to a third display with ABD characteristics that are different from the reference display.

12. The system of claim 9, further comprising an additional reference display wherein the reference display and the additional reference display are used to determine ABD settings that are acceptable for both the reference display and the additional reference display.

13. The system of claim 12, wherein the reference display and the additional reference display comprise a same display device with a split screen.

14. The system of claim 9, wherein the simulation unit outputs metadata based upon color correction settings, the metadata being transmitted to a simulator for correcting a consumer display device.

15. The system of claim 9, wherein the color correction unit performs an initial color correction process for providing color corrected picture content for a display with first ABD characteristics, and a subsequent color correction process is performed for providing color corrected picture content for a display with second ABD characteristics different from the first ABD characteristics.

16. The system of claim 15, further comprising a color transform unit configured to receive metadata from the simulation unit and color change metadata from the subsequent color correction process to manipulate content for a display with ABD characteristics different from the reference display.

17. The system of claim 16, wherein the color transform unit manipulates an output from the initial color correction process to provide content for display.

18. The system of claim 16, wherein the color transform unit receives as input ABD simulation information from the simulation unit and a color transform specification from the subsequent color correction process.

19. The system of claim 18, wherein ABD simulation information and a color transform specification are stored in lookup tables.

20. A method for compensating for average brightness dependency (ABD) differences between displays, comprising:
  color correcting source picture content on a reference display to produce color corrected picture content; and
  applying an ABD compensation characteristic to the color corrected picture content for displaying said source picture content on a display with different ABD characteristics than the reference display;
  wherein the color correcting and the applying of the ABD compensation characteristic are performed by at least one processor; and said source picture content is displayed on a plurality of reference displays and color correction is performed for the plurality of reference displays to determine an ABD specification for simulating a display with different ABD behavior.

* * * * *